US009953427B2

(12) United States Patent
Haim et al.

(10) Patent No.: US 9,953,427 B2
(45) Date of Patent: Apr. 24, 2018

(54) METHOD AND SYSTEM FOR PROCESSING AN IMAGE

(71) Applicant: Ramot at Tel-Aviv University Ltd., Tel-Aviv (IL)

(72) Inventors: Harel Haim, Tel-Aviv (IL); Emanuel Marom, Tel-Aviv (IL); Alex Bronstein, Haifa (IL)

(73) Assignee: Ramot at Tel-Aviv University Ltd., Tel-Aviv (IL)

(*) Notice: Subject to any disclaimer, the term of this patent is extended or adjusted under 35 U.S.C. 154(b) by 0 days.

(21) Appl. No.: 15/035,308

(22) PCT Filed: Jun. 10, 2015

(86) PCT No.: PCT/IL2015/050587
§ 371 (c)(1),
(2) Date: May 9, 2016

(87) PCT Pub. No.: WO2015/189845
PCT Pub. Date: Dec. 17, 2015

(65) Prior Publication Data
US 2016/0284093 A1 Sep. 29, 2016

Related U.S. Application Data

(60) Provisional application No. 62/010,000, filed on Jun. 10, 2014.

(51) Int. Cl.
*G06T 7/00* (2017.01)
*G06T 5/00* (2006.01)
(Continued)

(52) U.S. Cl.
CPC ............ *G06T 7/0069* (2013.01); *G06T 5/003* (2013.01); *G06T 5/50* (2013.01); *G06T 7/571* (2017.01);
(Continued)

(58) Field of Classification Search
CPC ....... G06T 5/003; G06T 7/00; G06T 2200/21; G06T 5/50; G06T 7/0069; G06T 7/571
See application file for complete search history.

(56) References Cited

U.S. PATENT DOCUMENTS 8,682,066 B2 3/2014 Milgrom et al.
2005/0094290 A1 5/2005 Ben-Eliezer et al.
(Continued)

FOREIGN PATENT DOCUMENTS

WO  WO 2015/189845  12/2015

OTHER PUBLICATIONS

Ivana Tosic et al. (Learning Sparse Representation of Depth), IEEE Journal of Selected Topics in Signal Processing, vol. 5, No. 5, Sep. 2011, pp. 941-952.*

(Continued)

*Primary Examiner* — Jingge Wu

(57) ABSTRACT

A method of processing an image is disclosed. The method comprises decomposing the image into a plurality of channels, each being characterized by a different depth-of-field, and accessing a computer readable medium storing an in-focus dictionary defined over a plurality of dictionary atoms, and an out-of-focus dictionary defined over a plurality of sets of dictionary atoms, each set corresponding to a different out-of-focus condition. The method also comprises computing one or more sparse representations of the decomposed image over the dictionaries.

49 Claims, 15 Drawing Sheets
(11 of 15 Drawing Sheet(s) Filed in Color)

(51) Int. Cl.
*G06T 5/50* (2006.01)
*G06T 7/571* (2017.01)

(52) U.S. Cl.
CPC .... *G06T 2200/21* (2013.01); *G06T 2207/10024* (2013.01); *G06T 2207/10141* (2013.01); *G06T 2207/20192* (2013.01)

(56) References Cited

U.S. PATENT DOCUMENTS

| | | | | |
|---|---|---|---|---|
| 2008/0170623 | A1* | 7/2008 | Aharon | G06K 9/6249 375/240.22 |
| 2009/0168117 | A1 | 7/2009 | Kearney | |
| 2010/0046829 | A1* | 2/2010 | Mahajan | G06K 9/40 382/159 |
| 2011/0064302 | A1* | 3/2011 | Ma | G06K 9/00275 382/159 |
| 2011/0184894 | A1* | 7/2011 | Cohen | G06N 5/02 706/12 |
| 2011/0222763 | A1 | 9/2011 | Milgrom et al. | |
| 2011/0279685 | A1* | 11/2011 | Alahi | G06K 9/00624 348/187 |
| 2013/0089151 | A1* | 4/2013 | Do | H04N 19/176 375/240.18 |
| 2013/0236090 | A1* | 9/2013 | Porikli | H04N 19/97 382/155 |
| 2014/0055595 | A1 | 2/2014 | Kimura | |
| 2014/0131447 | A1 | 5/2014 | Milgrom et al. | |
| 2014/0149444 | A1* | 5/2014 | Pompey | G06F 17/30477 707/760 |
| 2014/0267243 | A1* | 9/2014 | Venkataraman | G06T 7/557 345/419 |
| 2015/0242461 | A1* | 8/2015 | Kung | G06F 17/30982 707/769 |
| 2015/0242463 | A1* | 8/2015 | Lin | G06F 17/3069 707/769 |
| 2015/0279012 | A1* | 10/2015 | Brown | G06T 5/003 382/284 |

OTHER PUBLICATIONS

International Search Report and the Written Opinion dated Sep. 17, 2015 From the International Searching Auhtority Re. Application No. PCT/IL2015/050587.
Official Action dated Apr. 2, 2015 From U.S. Appl. No. 14/158,885.
Official Action dated Feb. 19, 2013 From U.S. Appl. No. 13/044,579.
Official Action dated May 29, 2013 From U.S. Appl. No. 13/044,579.
Aharon et al. "K-SVD: An Algorithm for Designing Overcomplete Dictionaries for Sparse Representation", IEEE Transactions on Signal Processing, 54(11): 4311-4322, Nov. 2006.
Ben-Eliezer et al. "An Optimal Binary Amplitude-Phase Mask for Hybrid Imaging Systems That Exhibit High Resolution and Extended Depth of Field", Optics Express, 16(25): 20540-20561, Nov. 26, 2008.
Chen et al. "Atomic Decomposition by Basis Pursuit", SIAM Journal on Scientific Computing, 20(1): 33-61, Published Electronically Aug. 5, 1998.
Couzinie-Devy et al. "Dictionary Learning for Deblurring and Digital Zoom", International Journal of Computer Vision, arXiv Reprint arXiv: 1110.0957(1): 1-14, Oct. 5, 2011.
Garcia et al. "Chromatic Aberration and Depth Extraction", Proceedings of the 15th International Conference on Pattern Recognition, Barcelona, Spain, Sep. 3-7, 2000, 1: 762-765, 2000.
Hu et al. "Single Image Deblurring With Adaptive Dictionary Learning", Procedings of the 2010 IEEE 17th International Conference on Image Processing, Hong Kong, China, Sep. 26-29, 2010, p. 1169-1172, Sep. 2010.
Huang et al. "Image Deblurring Based on Sparse Model With Dictionary Learning", Journal of Information & Computational Science, 10(1): 129-137, Jan. 1, 2013.
Krishnan et al. "Blind Deconvolution Using A Normalized Sparsity Measure", Proceedings of the 2011 IEEE Conference on Computer Vision and Pattern Recognition, CVPR '011, p. 233-240, Providence, RI, USA, Jun. 20-25, 2011, p. 233-240, Jun. 2011.
Milgrom et al. "Novel Approach for Extending the Depth of Field of Barcode Decoders by Using RGB Channels of Information", Optics Express, 18(16): 17027-17039, Aug. 2, 2010.
Milgrom et al. "Novel Approach for Extending the Depth of Field of Barcode Decoders by Using RGB Channels of Information", Optics Express, 18(16): 17027-17039, Jul. 27, 2010.
Milgrom et al. "Pupil Coding Masks for Imaging Polychromatic Scenes With High Resolution and Extended Depth of Field", Optics Express, 18(15): 15569-15584, Jul. 8, 2010.
Rubinstein et al. "Dictionaries for Sparse Representation Modeling", Proceedings of the IEEE, 98(6): 1045-1057, Apr. 22, 2010.
Shan et al. "High-Quality Motion Deblurring From A Single Image", ACM Transactions on Graphics, 27(3/Art.73): 1-10, Aug. 2008.
Zhang et al. "Sparse Representation Based Blind Image Deblurring", Proceedings of the 2011 IEEE International Conference on Multimedia and Expo, ICME '11, Barcelona, Spain, Jul. 11-15, 2011, p. 1-6, Jul. 2011.
Supplementary European Search Report and the European Search Opinion dated May 18, 2017 From the European Patent Office Re. Application No. 15807121.7. (13 Pages).
Lou et al. "Direct Sparse Deblurring", Journal of Mathematical Imaging and Vision, XP019871139, 39(1): 1-12, Published Online Aug. 14, 2010. Section 1.1.

* cited by examiner

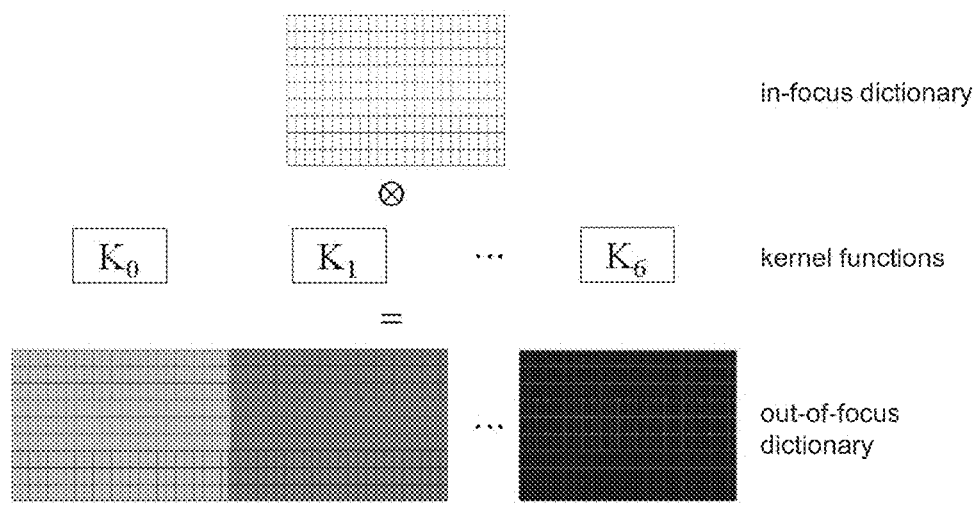
FIG. 7
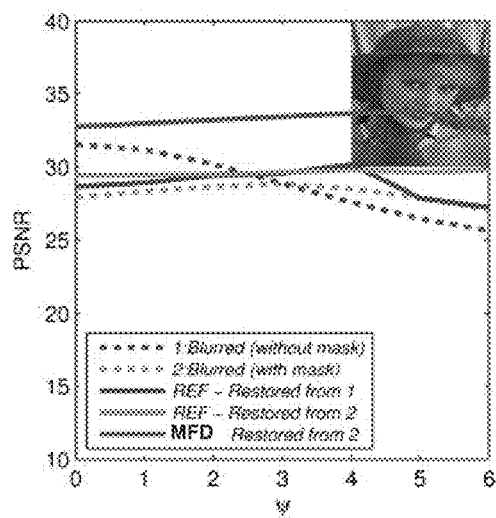
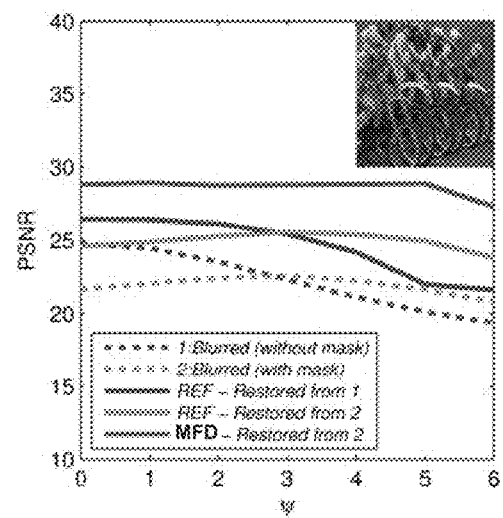
FIG. 8A  FIG. 8B

METHOD AND SYSTEM FOR PROCESSING AN IMAGE

RELATED APPLICATIONS

This application is a National Phase of PCT Patent Application No. PCT/IL2015/050587 having International filing date of Jun. 10, 2015, which claims the benefit of priority under 35 USC § 119(e) of U.S. Provisional Patent Application No. 62/010,000 filed on Jun. 10, 2014. The contents of the above applications are all incorporated by reference as if fully set forth herein in their entirety.

The work leading to this disclosure has received funding from the European Research Council under the European Union's Seventh Framework Programme (FP7/2007-2013)/ERC grant agreement no. 335491.

FIELD AND BACKGROUND OF THE INVENTION

The present invention, in some embodiments thereof, relates to imaging and, more particularly, but not exclusively, to a method and a system for image processing.

Digital cameras are widely used due to high quality and low cost CMOS technology and the increasing popularity of social network. The demand for high resolution and quality cameras, specifically for smart phones, led to a competitive market that constantly tries to create a better camera.

Digital image quality is determined by the imaging system properties and focal plane array sensor. With the increase in pixel number and density, the imaging system resolution is bound now mostly by optical system limitation. The limited volume in smart phones makes it very difficult to improve the image quality by optical solutions and therefore most of the advancements in recent years were software related.

Ref [1] discloses a binary symmetrical phase mask that allows increasing the camera's Depth of Field (DOF) for different uses such as barcode reading, face detection as well as other computer vision related applications. Ref. [2] discloses a RGB phase mask, whereby one gets different responses for the R, G and B channels, resulting in simultaneous capturing of three images, each with a different out-of-focus characteristics, but with the same magnification and in perfect registration. Different regions in the object space may exhibit good gray level features in one channel and poorer gray images in the other two channels. The three channels (RGB) jointly analyzed enable the extended DOF system response.

Additional background art includes U.S. Pat. No. 8,682,066, the contents of which are hereby incorporated by reference.

SUMMARY OF THE INVENTION

According to an aspect of some embodiments of the present invention there is provided a method of processing an image. The method comprises: decomposing the image into a plurality of channels. In some embodiments, each channel is characterized by a different depth-of-field. The method further comprises accessing a computer readable medium storing an in-focus dictionary defined over a plurality of dictionary atoms, and an out-of-focus dictionary defined over a plurality of sets of dictionary atoms, each set corresponding to a different out-of-focus condition; and computing at least one sparse representation of the decomposed image over the dictionaries.

According to some embodiments of the invention the decomposition is done optically at the time of image capture.

According to some embodiments of the invention the decomposition is done by digital image processing.

According to an aspect of some embodiments of the present invention there is provided a method of imaging. The method comprises: capturing an image of a scene by an imaging device having an optical mask selected to optically decompose the image into a plurality of channels. In some embodiments of the present invention each channels is characterized by different depth-dependence of a spatial frequency response of the imaging device. The method further comprises accessing a computer readable medium storing an in-focus dictionary defined over a plurality of dictionary atoms, and an out-of-focus dictionary defined over a plurality of sets of dictionary atoms, each set corresponding to a different out-of-focus condition; and computing at least one sparse representation of the decomposed image over the dictionaries.

According to an aspect of some embodiments of the present invention there is provided an imaging system. The system comprises: an imaging device having an optical mask and being configured for capturing an image of a scene, wherein the optical mask is selected to optically decompose the image into a plurality of channels. In some embodiments of the present invention each channels is characterized by different depth-dependence of a spatial frequency response of the imaging device. The system optionally and preferably comprises a computer readable medium storing an in-focus dictionary defined over a plurality of dictionary atoms, and an out-of-focus dictionary defined over a plurality of sets of dictionary atoms, each set corresponding to a different out-of-focus condition; and a data processor configured for accessing the computer readable medium and computing at least one sparse representation of the decomposed image over the dictionaries.

According to an aspect of some embodiments of the present invention there is provided a portable device, comprising the imaging system.

According to some embodiments of the present invention the portable is selected from the group consisting of a cellular phone, a smartphone, a tablet device, a mobile digital camera, a wearable camera, a personal computer, a laptop, a portable media player, a portable gaming device, a portable digital assistant device, and a portable navigation device.

According to an aspect of some embodiments of the present invention there is provided a computer software product. The computer software product comprises a computer-readable medium, optionally and preferably a non-transitory computer-readable medium, in which an in-focus dictionary, an out-of-focus dictionary and program instructions are stored, wherein the in-focus dictionary is defined over a plurality of dictionary atoms, and the out-of-focus dictionary defined over a plurality of sets of dictionary atoms, each set corresponding to a different out-of-focus condition, and wherein the instructions, when read by a data processor, cause the data processor to receive an image, to decompose the image into a plurality of channels, to access the in-focus dictionary and the out-of-focus dictionary, and to compute at least one sparse representation of the decomposed image over the dictionaries.

According to some embodiments of the present invention the plurality of channels is a plurality of color channels.

According to some embodiments of the present invention the computation of the sparse representation is executed without iteration.

According to some embodiments of the present invention the image is divided into a plurality of patches, and the computation of the sparse representation is performed by expressing each patch as a combination of atoms of a sub-dictionary of the out-of-focus dictionary.

According to some embodiments of the invention each patch of at least a few (e.g., at least 50% or at least 60% or at least 70%) of the patches overlaps with at least one adjacent patch.

According to some embodiments of the invention for each of at least a few pairs of adjacent patches, the overlap equals at least 50% or at least 60% or at least 70% or at least 80% of an area of each patch of the pair.

According to some embodiments of the present invention the out-of-focus dictionary comprises a plurality of sub-dictionaries, each being characterized by a defocus parameter, and wherein different sub-dictionaries correspond to different values of the defocus parameter.

According to some embodiments of the invention each of the plurality of sub-dictionaries is obtainable from the in-focus dictionary by an inner product of the in-focus dictionary by a kernel function characterized by a respective defocus parameter.

According to some embodiments of the invention the out-of-focus dictionary comprises at least three sub-dictionaries, more preferably at least four sub-dictionaries, more preferably at least five sub-dictionaries, more preferably at least six sub-dictionaries, more preferably at least seven sub-dictionaries.

According to some embodiments of the invention at least P % of atoms of the in-focus dictionary are characterized by a spatial frequency which is at most a predetermined cutoff frequency, the predetermined cutoff frequency corresponding to at most T transitions between dark and bright picture-elements along any straight line across a respective atom, wherein P is at least 50 or at least 60 or at least 70 or at least 80 or at least 90, wherein T equals $\lfloor 0.5 \rfloor$ or $\lfloor 0.4 \rfloor$ or $\lfloor 0.3 \rfloor$ or $\lfloor 0.2 \rfloor$, and wherein L is a width of the atom.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system of coordinates useful for describing a thin-lens imaging system, according to some embodiments of the present invention;

FIG. 2 shows Modulation Transfer Function (MTF) as calculated for a circular aperture for different value of a defocus parameter $\psi$ according to some embodiments of the present invention;

Figure 4A:
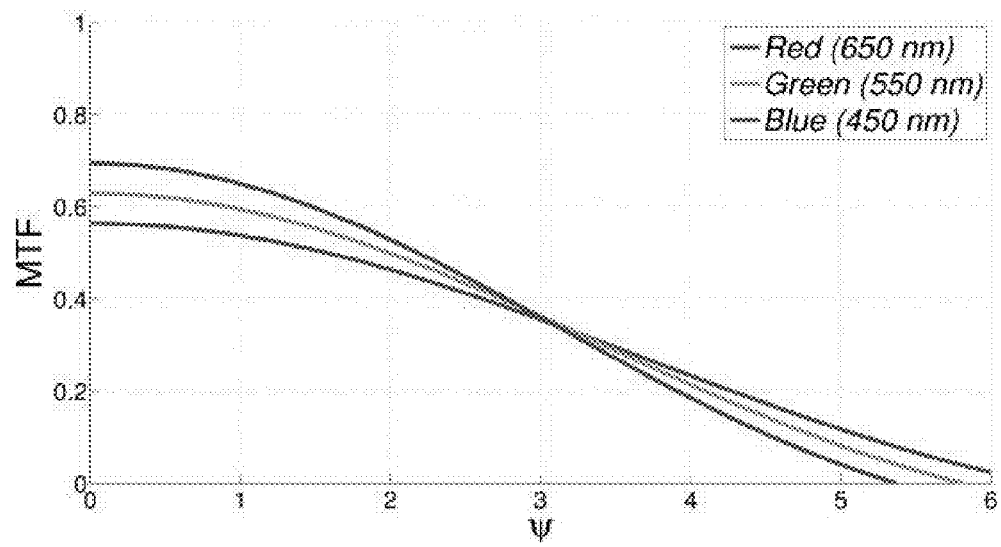
Figure 4B:
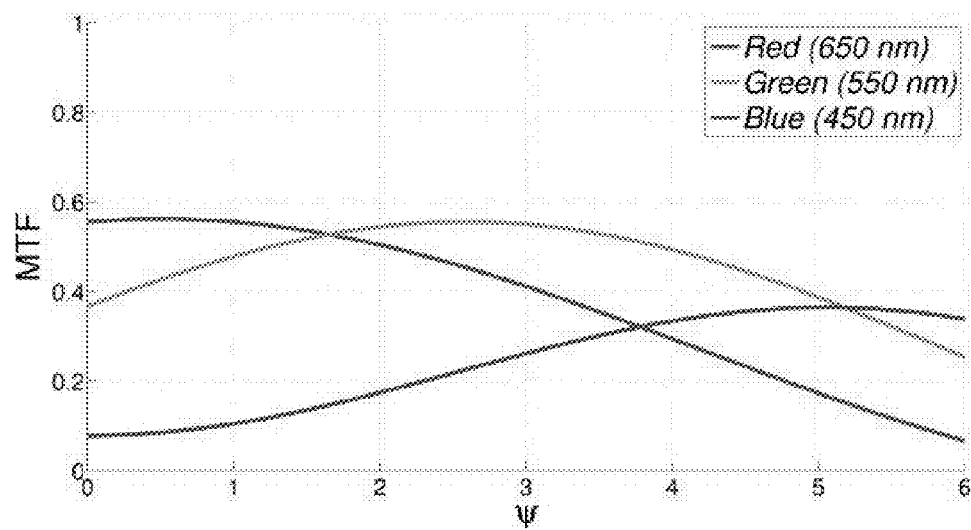
Figure 5A:
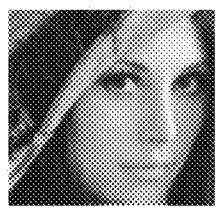
Figure 5B:
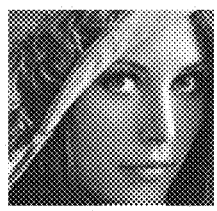
Figure 5C:
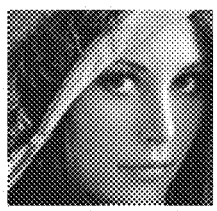
Figure 5D:
Figure 5E:
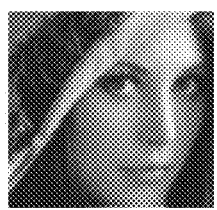
Figure 5F:
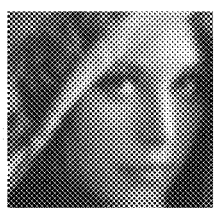
Figure 5G:
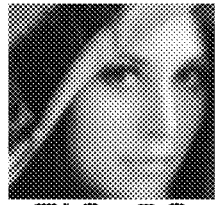
Figure 5H:
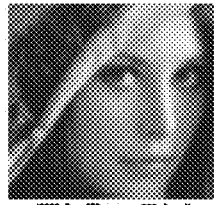
Figure 5I:
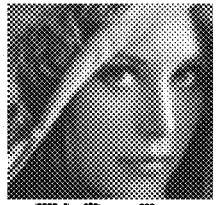
Figure 5J:
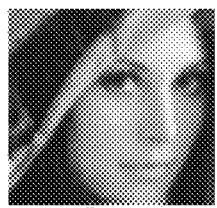
Figure 5K:
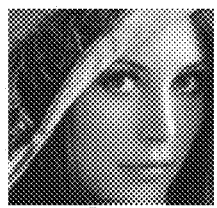
Figure 5L:
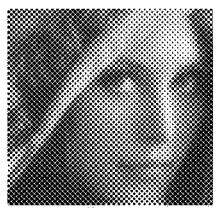
Figure 5M:
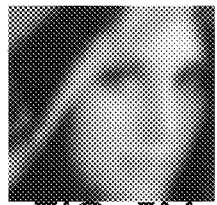
Figure 5N:
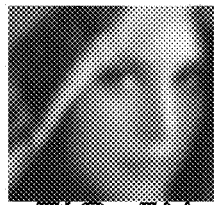
Figure 5O:
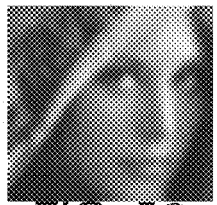
Figure 5P:
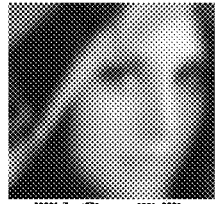
Figure 5Q:
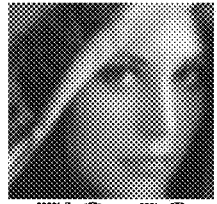
Figure 5R:
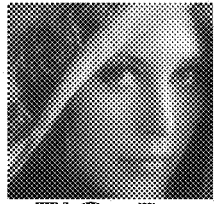
Figure 9A:
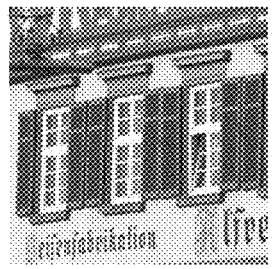
Figure 9B:
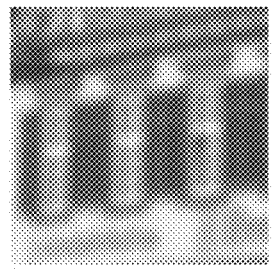
Figure 9C:
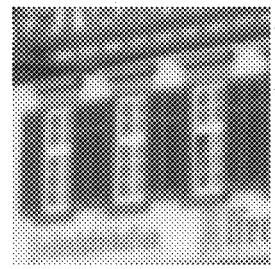
Figure 9D:
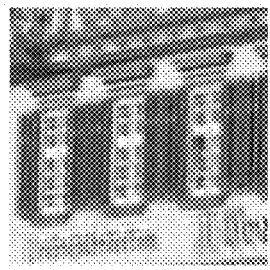
Figure 9E:
Figure 9F:
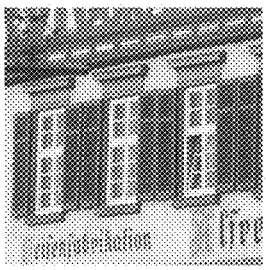
Figure 10A:
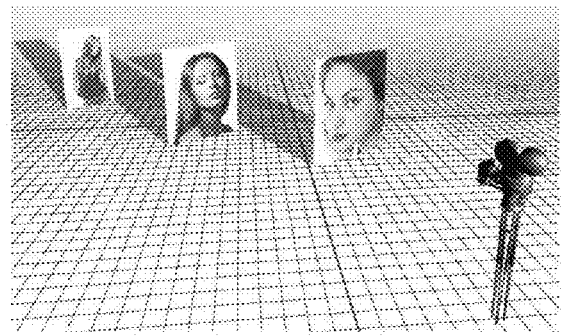
Figure 10B:
Figure 10C:
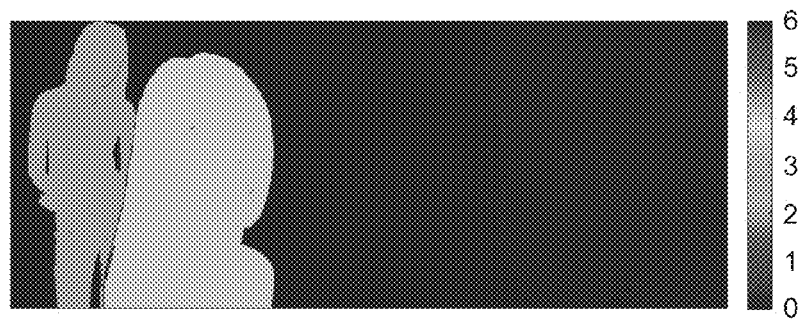
Figure 11A:
Figure 11B:
Figure 11C:
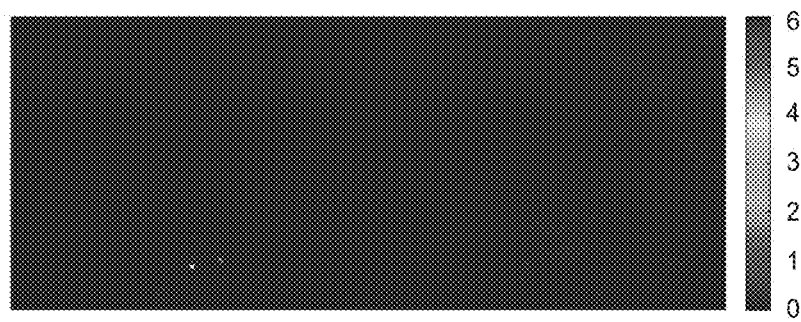
Figure 12A:
Figure 12B:
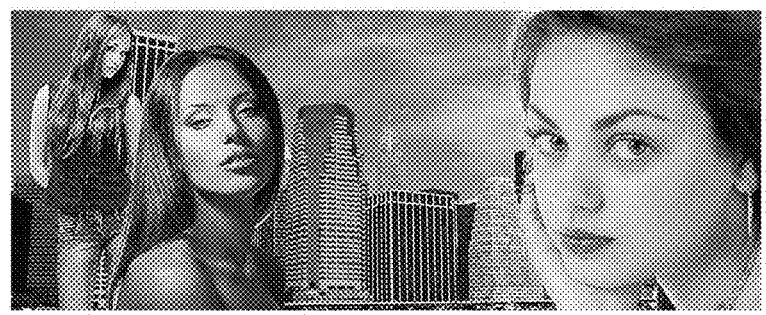
Figure 12C:
Figure 13A:
Figure 13B:
Figure 13C:
Figure 13D:
Figure 14:
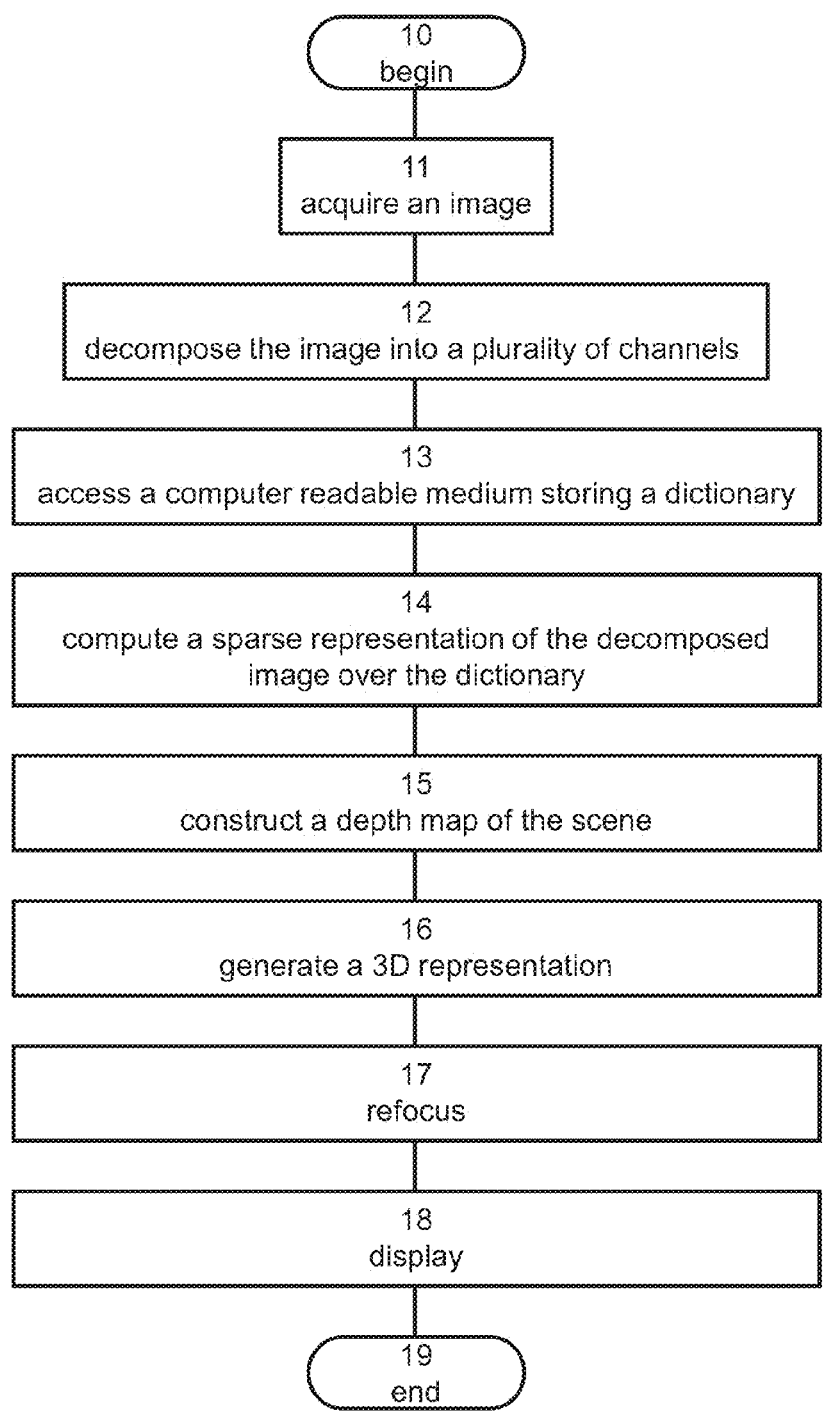
Figure 15:
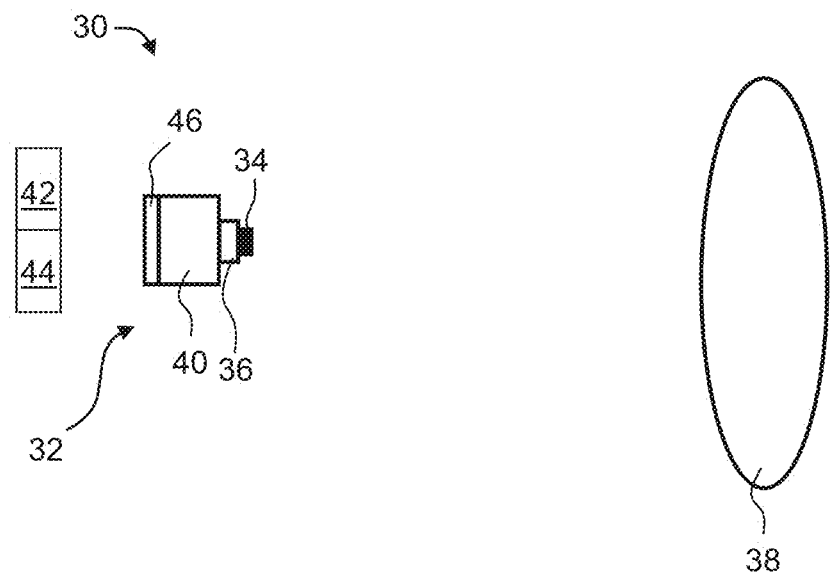
Figure 16:
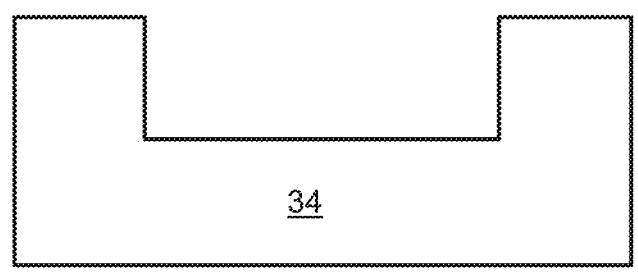

FIGS. 3A-D show comparison between MTF response with and without an RGB mask, according to some embodiments of the present invention;

FIGS. 4A and 4B show comparison between MTF responses of a single frequency as a function of a defocus parameter $\psi$ in case of clear aperture (FIG. 4A) and aperture with an RGB mask (FIG. 4B), obtained according to some embodiments of the present invention;

FIGS. 5A-R are Lena images obtained according to some embodiments of the present invention with a mask-equipped pupil (FIGS. 5D-F, 5J-L and 5P-R), as well as by a clear aperture system (FIGS. 5A-C, 5G-I and 5M-O), at a red channel (left column), a green channel (middle column), and blue channel (right column), for $\psi=0$ (FIGS. 5A-F), $\psi=3$ (FIGS. 5G-L) and $\psi=6$ (FIGS. 5M-R);

FIGS. 6A-D show randomly selected dictionaries (FIGS. 6A and 6B) and low spatial frequency dictionaries (FIGS. 6C and 6D), before (FIGS. 6A and 6C) and after (FIGS. 6B and 6D) imaging, according to some embodiments of the present invention;

FIG. 7 is a schematic illustration of a procedure according to embodiments of the present invention in which a stack blurred dictionary is constructed using an original dictionary and a plurality of different blurring kernels corresponding to different defocus parameters;

FIGS. 8A-H show comparisons between several image processing techniques for eight different images, as obtained according to some embodiments of the present invention;

FIGS. 9A-F show example of image blurring and restoration, according to some embodiments of the present invention, where FIG. 9A shows the input image, FIGS. 9B and 9C show images corresponding to out-of-focus ($\Psi=6$) with clear aperture (FIG. 9B) and with phase mask (FIG. 9C), FIGS. 9D and 9E are results of de-blurring, respectively applied to FIGS. 9B and 9C using a process found in [8], and FIG. 9F is a result of de-blurring applied to FIG. 9C using a multi-focus dictionary (MFD);

FIGS. 10A-C exemplify a scene consisting of a finite number of flat objects, where FIG. 10A shows objects located at different distance from the camera, FIG. 10B shows the input image, and FIG. 10C shows a corresponding depth map;

FIGS. 11A-C exemplify a restoration technique to a scene consisting of a finite number of flat objects without decomposing the image, where FIG. 11A shows a defocused image, FIG. 11B shows the restored image, and FIG. 11C shows a depth map according to the most used sub-dictionary in each area;

FIGS. 12A-C exemplify a restoration technique to a scene consisting of a finite number of flat objects with image decomposition, where FIG. 12A shows a defocused image, FIG. 12B shows the restored image, and FIG. 12C shows a depth map according to the most used sub-dictionary in each area;

FIGS. 13A-D show experimental results comparing images taken without a phase mask and without post processing (FIGS. 13A and 13C), with images captured and processed according to some embodiments of the present invention (FIGS. 13B and 13D);

FIG. 14 is a flowchart diagram describing a method for processing an image, according to some embodiments of the present invention;

FIG. 15 is a schematic illustration of an imaging system, according to some embodiments of the present invention; and FIG. 16 is a schematic illustration of a phase mask, according to some embodiments of the present invention.

DESCRIPTION OF SPECIFIC EMBODIMENTS OF THE INVENTION

The present invention, in some embodiments thereof, relates to imaging and, more particularly, but not exclusively, to a method and a system for image processing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Sparse representation of natural image signals is a powerful tool for image representation, compression and restoration. By using an over complete dictionary of patterns, small patches from an image are presented in the present examples as a linear combination of a few atoms (samples) from the dictionary. Known techniques assume that the blurring kernel is known [3-5] or use an iterative computing process to evaluate such kernel [6-9]. The present inventors found that the differences between the responses of the RGB channels, e.g., when the imaging system includes a phase mask, can be used to restore the blurred image in a single run without prior knowledge of the blurring kernel.

Integration between optics and image processing has been presented in many Computational photography related work. Light field cameras [10] presented some abilities concerning focus manipulation and improving DOF. Nevertheless, the present inventors found that light field cameras suffer from low resolution, noise and require a unique design which makes it harder to integrate them with existing systems, such as, but not limited to, smartphones, laptop cameras, etc. Ref. [11] describes a coded aperture with a conventional camera to achieve similar results. A different approach [12] utilize lens with deliberately high chromatic aberration to achieve color separation. The present inventors found that this approach requires special lens design for each system.

While conceiving the present invention it has been hypothesized and while reducing the present invention to practice it has been realized that representation of images using an out-of-focus dictionary can be improved when the images are decomposed into channels, and the dictionary comprises a plurality of sets of dictionary atoms, where each set corresponding to a different defocus condition. It was found by the present inventors that such a combination, between image decomposing into a plurality of channels and out-of-focus dictionary with a plurality of sets of atoms, facilitates more accurate representation because it allows the representation to weigh the dictionary atoms according to the out-of-focus condition of each image region.

FIG. 14 is a flowchart diagram describing a method for processing an image, according to some embodiments of the present invention. Preferably, but not necessarily the method also captures the image.

The method can be embodied in many forms. For example, it can be embodied in on a tangible medium such as a computer for performing the method operations. It can be embodied on a computer readable medium, comprising computer readable instructions for carrying out the method operations. It can also be embodied in an electronic device having digital computer capabilities arranged to run the computer program on the tangible medium or execute the instruction on a computer readable medium. A representative example of such an electronic device is data processor of a mobile device, such as, but not limited to, a smartphone or a tablet device.

Computer programs implementing the method according to some embodiments of this invention can commonly be distributed to users on a distribution medium such as, but not limited to, CD-ROM, flash memory devices, flash drives, or, in some embodiments, drives accessible by means of network communication, over the internet (e.g., within a cloud environment), or over a cellular network. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. Computer programs implementing the method according to some embodiments of this invention can also be executed by one or more data processors that belong to a cloud computing environment. All these operations are well-known to those skilled in the art of computer systems. Data used and/or provided by the method of the present embodiments can be transmitted by means of network communication, over the internet, over a cellular network or over any type of network, suitable for data transmission.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which an image of a scene is acquired. The image can be captured by the method using an imaging device, or received by the method from an external source, such as a computer readable medium storing a previously captured image. The method preferably continues to 12 at which the image is decomposed into a plurality of channels. The decomposing 12 can be done optically, at the time of image capture, for example, by allowing light from the scene to pass an optical mask that decomposes the light into a plurality of channels. Alternatively, the decomposing 12 can be done by digital image processing, for example, while decomposing the data stored in each picture-element (e.g., an image pixel) into a plurality of channels.

Each of the channels is characterized by a different range of effective depth-of-field (DOF). The DOF is typically parameterized using a parameter known as the defocus parameter $\Psi$. In typical imaging systems, the defocus parameter is, in absolute value, within the range 0 to 6 radians, but other ranges are also envisioned. In some embodiments of the present invention each of the channels is characterized by a different depth-dependence of a spatial frequency response of the imaging device used for captured the image. The spatial frequency response can be expressed, for example, as an Optical Transfer Function (OTF).

In various exemplary embodiments of the invention the channels are defined according to the wavelengths of the light arriving from the scene. In these embodiments, each channel corresponds to a different wavelength range of the light. As will be appreciated by one of ordinarily skilled in the art, different wavelength ranges correspond to different depth-of-field ranges and to different depth-dependence of the spatial frequency response. A representative example of a set of channels suitable for the present embodiments is a red channel, corresponding to red light (e.g., light having a spectrum having an apex at a wavelength of about 620-680 nm), a green channel, corresponding to green light (spectrum having an apex at a wavelength of from about 520 to about 580 nm), and a blue channel, corresponding to blue light (spectrum having an apex at a wavelength of from about 420 to about 500 nm). Such a set of channels is referred to herein collectively as RGB channels.

When the decomposing is executed optically, a phase mask, such as, but not limited to, an RGB phase mask is optionally and preferably employed. The mask is preferably selected for optically delivering different exhibited phase shifts for different wavelength components of the light. For example, the mask can generate phase-shifts for red light, for green light and for blue light, wherein each one of these phase-shifts is different from the other two phase-shifts by an amount which is not $2n\pi$, where n is an integer. As a representative example, that is not to be considered as limiting, the first phase-shift can be about $\pi$ radians (modulo $2\pi$) the second phase-shift can be about $\pi/2$ radians (modulo $2\pi$) and the third phase-shift can be close to zero, e.g., less than 0.1 radians (modulo $2\pi$).

For example, the phase mask can have one or more concentric rings that may form a grove and/or relief pattern on a transparent mask substrate. Each ring preferably exhibits a phase-shift that is different to the phase-shift of the remaining mask regions. The mask can be a binary amplitude phase mask, but non-binary amplitude phase masks are also contemplated.

Optionally, but not necessarily, the mask includes a single ring that extends between 0.1 and 0.7 of the radius of the mask. The mask can be placed in the optical train of the imaging device, for example, in front of the lens. The mask is optionally and preferably thin, for example, from about 1 µm to about 20 µm, or from about 2 µm to about 10 µm, or from about 2 µm to about 8 µm. The diameter of the mask depends on the diameter of the lens of the imaging device, and can any diameter be from about 1 mm to about 100 mm. A representative example of a mask suitable for the present embodiments is described in U.S. Pat. No. 8,682,066 and Ref. [2]. The mask can be supported by an optically transparent supporting member, e.g., a glass plate, or be positioned on top of an existing optical element, such as, but not limited to, a lens, e.g., a lens of the imaging system.

The method continues to 13 at which a computer readable medium storing one or more dictionaries is accessed. In various exemplary embodiments of the invention the computer readable medium stores an in-focus dictionary D and an out-of-focus dictionary $D_b$. The in-focus dictionary D is defined over a set $\{s\}$ of dictionary atoms, and the out-of-focus dictionary $D_b$ is defined over a plurality of sets $\{b\}_j$ of dictionary atoms, wherein each set of $D_b$ corresponds to a different out-of-focus condition. For example, each set of atoms in $D_b$ can correspond to a different value of the defocus parameter $\psi$.

Each set of atoms in $D_b$ is referred to herein as a sub-dictionary of $D_b$. In some embodiments $D_b$ comprises at least three sub-dictionaries (respectively corresponding to three different out-of-focus conditions, e.g., three different values of $\psi$), in some embodiments $D_b$ comprises at least four sub-dictionaries (respectively corresponding to four different out-of-focus conditions, e.g., four different values of $\psi$), in some embodiments $D_b$ comprises at least five sub-dictionaries (respectively corresponding to five different out-of-focus conditions, e.g., five different values of $\psi$), in some embodiments $D_b$ comprises at least six sub-dictionaries (respectively corresponding to six different out-of-focus conditions, e.g., six different values of $\psi$), in some embodiments $D_b$ comprises at least seven sub-dictionaries (respectively corresponding to seven different out-of-focus conditions, e.g., seven different values of $\psi$).

The dictionaries can form a complete basis or, more preferably, they can be redundant dictionaries (also referred to in the literature as overcomplete dictionaries). A redundant dictionary is a dictionary that includes more atoms than the minimal number of base atoms required to represent the image. A sparse representation typically includes a portion (e.g., less than 80% or less than 60% or less than 40% or less than 20% or less than 10% or less than 5%) of the atoms from the available atoms in the dictionary.

The in-focus dictionary D can be prepared, according to some embodiments of the present invention, from a reference image which is preferably a natural image. The natural image can be captured by any imaging system. In experiments performed by the present inventors, the publicly available "Lena" image has been used as a reference image. A large number of candidate atoms (e.g., at least 10,000 candidate atoms or at least 20,000 candidate atoms or at least 40,000 candidate atoms or at least 80,000 candidate atoms, e.g., 100,000 candidate atoms or more) are selected from the image. The candidate atoms can be patches of adjacent picture-elements (e.g., patches of pixels). For example, each candidate atom can be a patch having the shape of a square of N×N picture-elements, where N can be from about 4 to about 30, or from about 4 to about 16, e.g., N=8. From the collection of candidate atoms, the atoms that constitute the dictionary can be thereafter selected. The selection of atoms from the collection of candidate atoms is optionally and preferably according to the similarity of each candidate atom with other candidate atoms in the collection, more preferably with all other candidate atoms in the collection. The similarity can be determined by calculating the inner product between the candidate atoms, wherein higher inner product corresponds to higher similarity. In various exemplary embodiments of the invention the in-focus dictionary includes $N_D$ atoms that are most similar to all other candidate atoms in the collection. The value of $N_D$ is smaller than the number of candidate atoms in the collection. Typically, $N_D$ is less than 1000 or less than 800 or less than 600.

According to some embodiments of the invention at least a portion (e.g., at least 50% or at least 60% or at least 70% or at least 80% or at least 90%) of the atoms of the in-focus dictionary D are characterized by low spatial frequency. It was found by the present inventors that use of low spatial frequencies patches for D, increases the likelihood of generating an accurate representation of the image.

As used herein, "low spatial frequency" means a spatial frequency which is at most a predetermined cutoff frequency, the predetermined cutoff frequency corresponding to at most T transitions between dark and bright picture-elements along any straight line across a respective atom, where T can be $\lfloor 0.5 \rfloor$ or $\lfloor 0.4 \rfloor$ or $\lfloor 0.3 \rfloor$ or $\lfloor 0.2 \rfloor$, and where L is the width of the atom, and $\lfloor . \rfloor$ denotes the Floor function.

Herein, the width of an atom or an image patch is measured along the smallest dimension of the atom or image patch. Typically, the width is express in units of picture-elements (e.g., pixels).

The dictionaries $D_b$ and D are preferably related via a set of kernel functions that represent image blurring resulting from the out-of-focus conditions. According to some embodiments of the invention, each sub-dictionary of $D_b$ is obtainable from the in-focus dictionary D (once constructed, e.g., as explained above) by an inner product of D by a respective kernel function characterized by a respective defocus parameter. This embodiment is illustrated in FIG. 7.

Figure 6A:
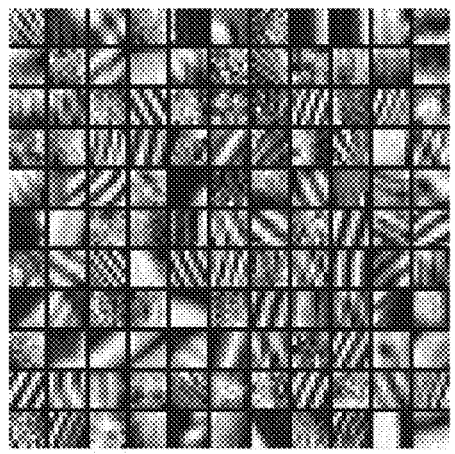
Figure 6B:
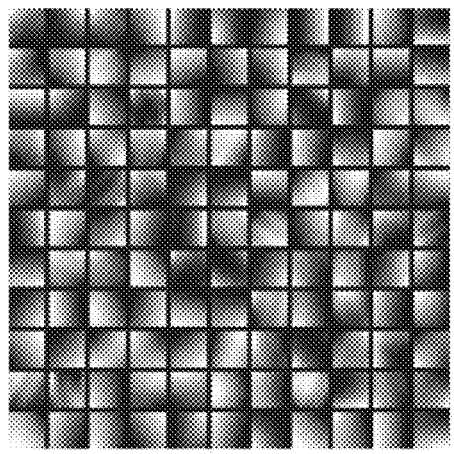
Figure 6C:
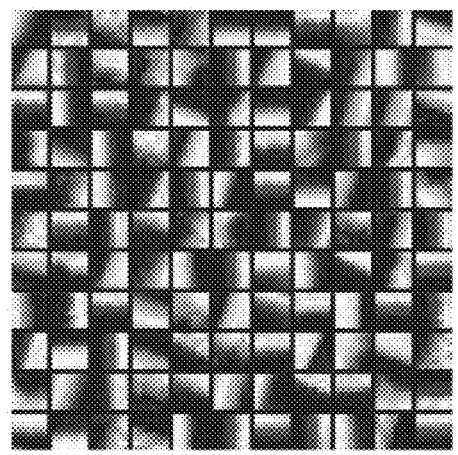

Representative examples of in-focus dictionaries suitable for the present embodiments are provided in FIGS. 6A and 6C. Representative examples of a set of atoms of an out-of-focus dictionary suitable for the present embodiments are provided in FIGS. 6B and 6D.

The method continues to 14 at which a sparse representation of the decomposed image over the dictionaries is computed. This can be done, for example, by dividing the decomposed image into a plurality of patches, and calculating for each atom $b_i$ of $D_b$ a coefficient $\alpha_i$ that estimates the contribution of the respective atom to an image patch. Specifically, a positive coefficient indicates that the respective atom is a component in the image, and a non-positive coefficient (or a coefficient below a certain threshold) indicates that the image is devoid of the respective dictionary atom. In some embodiments of the present invention, the coefficients are calculated under a non-negativity constraint. This can be done, for example, by replacing all negative coefficients by zeros. In some embodiments of the present invention the sparse representation is computed without iteration.

Many techniques for calculating such coefficients can be employed. Generally, these techniques include, but are not limited to, a pursuit algorithm, e.g., Orthogonal Matching Pursuit, Matching Pursuit, Basis Pursuit, Order Recursive Matching Pursuit, Focal Underdetermined System Solver, or any combination or variation thereof.

Each patch of at least a few (e.g., 50% or 60% or 70% or 80% or 90% or all) of the patches of the decomposed image preferably overlaps with at least one adjacent patch. The overlap can equals at least 50% or at least 60% or at least 70% or at least 80% of the area of each patch of the pair of overlapping patches.

The technique that calculates the coefficients (e.g., the pursuit algorithm) selects from $D_b$ the atom that best match the respective patch of the input image. Since $D_b$ includes several sub-dictionaries, it varies significantly for different kernels. A patch of the decomposed input image also exhibits different response for each out-of-focus condition (e.g., for each wavelength range or color). The responses of the imaging system are therefore distinguishable among different kernels so that the likelihood that the patch of the input image is in accordance with atoms from $D_b$ that experience the same out-of-focus condition is high. Thus, the technique of the present embodiments improves the likelihood that the correct atoms are assigned with higher coefficients.

Once the coefficients are calculated, the image can be further processed using the computed coefficients and the atoms of the in-focus dictionary D. Typically, this process results in a sharpened image, because the atoms of D represent sharp patches. In other words, a sparse representation of the decomposed image using the calculated coefficients $\alpha_i$ and the atoms $s_i$ of D substantially inverts the effect of the kernels used to construct $D_b$ from D, thus restoring a sharpened image.

Following the calculation of the sparse representation coefficients $\alpha_i$, the value of the defocus parameter $\psi$ is generally known for all the patches of the input image that form the sparse representation. This value of $\psi$ is typically the value that is associated with the kernel function from which the sub-dictionary that contains the atom that is multiplied by the highest coefficient.

The distribution of $\psi$ values among the patches can be used in more than one way.

In some embodiments, a depth map of the scene is constructed, as indicated at 15. This can be done based on the sparse representation, or, more specifically, using the distribution of $\psi$ values among the patches. Preferably, the depth map is constructed based on a single image frame. The depth map describes relative depths of different objects in the scene. The relative depths can be expressed in the depth map in units of normalized length, or, more preferably in terms of the defocus parameter $\psi$. For example, the depth map can assign an estimated value of $\psi$ for each object in the scene. Since different values for $\psi$ correspond to different ranges between the object and the imaging device, the estimated values of $\psi$ can be transformed into estimated ranges. Since the depth map correlates with range data, the method can use the depth map to generate a three-dimensional (3D) representation (e.g., 3D image) of the scene, as indicated at to 16.

In some embodiments of the present invention the method continues to 17 at which the image is refocused.

As used herein, "refocusing" means processing an input image which is obtained with an imaging device to form a reconstructed image (referred to herein as refocused image) which is focused on a predetermined plane other than the plane on which the imaging device was focused at the time of image captured.

In the refocused image the sharpness of the objects at the predetermined plane is typically higher than the sharpness of objects at other planes.

The refocusing operation is optionally and preferably executed using the sparse representation, or, more specifically, using the distribution of ψ values among the patches. For example, once an image region has been identified to be associated with a certain ψ value, the region can be sharpened by using the sharp dictionary D with the same set of α coefficients.

The method optionally continues to 18 at which the processed image is displayed on a display device. The processed image can also be recorded on a non-volatile computer-readable medium. The processed image can be the sharpened image, the refocused image, the 3D image or any other image obtained using one or more of the dictionaries D and $D_b$.

The method ends at 19.

FIG. 15 is a schematic illustration of an imaging system 30, according to some embodiments of the present invention. System 30 comprises an imaging device 32 for capturing an image of a scene 38. Imaging device 32 preferably comprises a device body 40, a lens 36 and an optical mask 34 selected to optically decompose the image or the light from scene 38 into a plurality of channel, as further detailed hereinabove. Mask 34 is preferably mounted on lens 36. A representative example of mask 34 in embodiments in which the mask includes a single ring forming a relief pattern is schematically illustrated in FIG. 16.

System 30 additionally comprises a computer readable medium 42 for storing the in-focus dictionary D and out-of-focus dictionary $D_b$, and a data processor 44 for accessing medium 42 and computing a sparse representation of the decomposed image over the dictionaries, as further detailed hereinabove. Data processor can be configured for executing any of the image processing operations described above with respect to method 10. Preferably, but not necessarily, data processor comprises a dedicated circuit, for example, an application-specific integrated circuit (ASIC) configured for executing these operations. Also contemplated is the use of a field-programmable gate array (FPGA) for performing at least a few of the image processing operations.

Each of medium 42 and/or processor 44 can be separated from imaging device 32 or they can be incorporated in body 40. In some embodiments of the present invention system 30 comprises a display device 46 that receives the processed image generated by data processor 44 and displays it.

System 30 can be incorporated in a portable device selected from the group consisting of a cellular phone, a smartphone, a tablet device, a mobile digital camera, a wearable camera, a portable media player, a personal computer, a laptop, a portable gaming device, a portable digital assistant device, and a portable navigation device.

The system and method of the present embodiments enjoy many advantages not possessed by conventional systems.

One advantage of the system and method of the present embodiments is that the technique can be adapted for lens systems that are fully corrected. This is because the processing technique of the present embodiments allows restoration after image capture. This is particularly advantageous when the system is incorporated in a mobile device such as a smartphone or a tablet, since short optical trains typically are not associated with perfectly corrected lenses. This is also advantageous from the standpoint of cost since lens systems with shorter optical trains are less expensive.

The system and method of the present embodiments can also be implemented in low-light conditions. Conventional systems for capturing images under low-light conditions suffer from the limitation of reduced DOF. The processing technique of the present embodiments at least partially restores the loss of DOF.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as the present example from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The present examples present a technique for fusing the plurality of channels into a single color image with extended DOF and improved appearance via a post-processing approach.

Out-of Focus Effects

Figure 1:
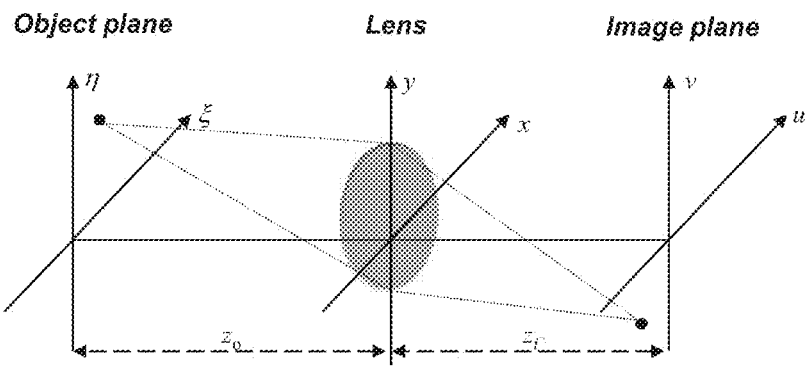

An optical system can be described as a single "black box" element with a certain transfer function. For simplicity and without loss of generality it is assumed in that the imaging system consists of a single lens with a focal length f as shown FIG. 1. The object plane, lens plane and image plane coordinates are $(\xi,\eta)$, $(x,y)$ and $(u,v)$ respectively, $z_o$ is the distance from the object to the lens and $z_i$ is the distance from the lens to the image plane.

It is further assumed that the scenes are incoherently illuminated, so that the optical system is linear with respect to the intensity [13]. In such case, the output image $I_i$ can be expressed as the convolution of the imaging system point spread function (PSF) $h_1$ with the ideal image intensity $I_g$:

$$I_i(u,v) = (h_I * I_g)(u,v) \quad \text{(EQ. 1.1)}$$

The properties of such linear system can be analyzed in the spatial frequency domain using Fourier transform representation. The normalized Fourier transform of the PSF is known as the Optical Transfer Function (OTF) and it describes the system response in terms of spatial frequencies:

$$OTF(v_x, v_y) = \frac{F\{h_I(u, v)\}}{\int_{-\infty}^{\infty} h_I(u, v)\,du\,dv} \quad \text{(EQ. 1.2)}$$

The OTF is the normalized autocorrelation of the system pupil function $P(x,y)$:

$$OTF(v_x, v_y) = (P * \overline{P})(v_x, v_y) \quad \text{(EQ. 1.3)}$$

The Modulation transfer function (MTF) is the absolute value of the OTF and is one of the ways to describe imaging system properties. The MTF substantially provides the attenuation factor of all spatial frequencies passing through the system.

The imaging condition defines the relation between $z_o$, $z_i$ and f, and can be written as:

$$\frac{1}{z_o} + \frac{1}{z_i} - \frac{1}{f} = 0 \quad \text{(EQ. 1.4)}$$

When the imaging condition is satisfied, the PSF is proportional to the Fourier transform of the pupil P. When imaging condition is not satisfied, the imaging system suffers from out-of focus (OOF) aberration which degrades the image quality (e.g., lower contrast level, loss of sharpness and information).

In digital systems, when the image size of a point source in the object plane is smaller than the pixel size in the detector plane, a small deviation from the imaging condition results in an OOF aberration that is considered insignificant. The range in which the OOF aberration of the object is insignificant is known as the depth-of field (DOF).

The OOF aberration can be described as a wavefront error, e.g., a phase error in the pupil plane [13]. This phase error is represented as a quadratic phase term in the pupil plane. Thus, in the presence of OOF aberrations, the generalized pupil can be expressed as:

$$\tilde{P}(x, y) = P(x, y) \cdot \exp\left[j\frac{\pi}{\lambda}\left(\frac{1}{z_o} + \frac{1}{z_{img}} - \frac{1}{f}\right)(x^2 + y^2)\right] \quad \text{(EQ. 1.5)}$$

where $z_{img}$ is the detector plane location when the object is in the nominal position, $z_o$ is the actual object position and $\lambda$ is the optical wavelength. The special case in which the bracketed term is null, is referred to as the in-focus condition.

In case of a circular aperture with radius R a defocus parameter $\Psi$ is defined as:

$$\Psi = \frac{\pi R^2}{\lambda}\left(\frac{1}{z_o} + \frac{1}{z_{img}} - \frac{1}{f}\right) = \frac{\pi R^2}{\lambda}\left(\frac{1}{z_{img}} - \frac{1}{z_i}\right), \quad \text{(EQ. 1.6)}$$

and the generalized pupil in this case is:

$$\tilde{P}(x, y) = P(x, y) \cdot \exp\left[j\Psi\left(\frac{x^2 + y^2}{R^2}\right)\right]. \quad \text{(EQ. 1.7)}$$

Figure 2:
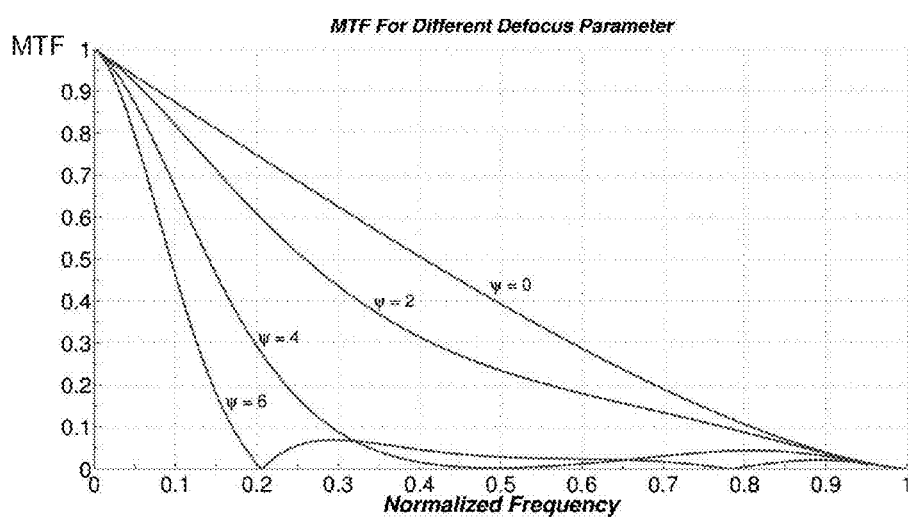
Figure 3A:
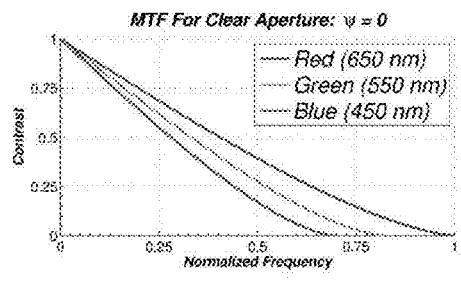
Figure 3B:
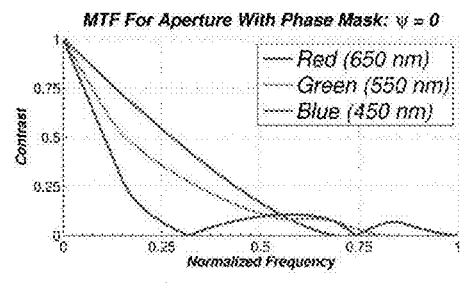
Figure 3C:
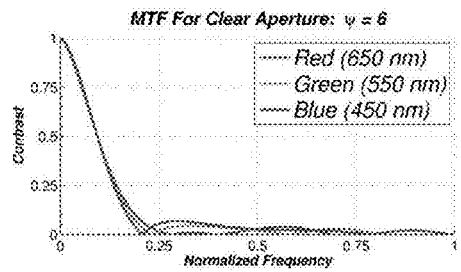
Figure 3D:
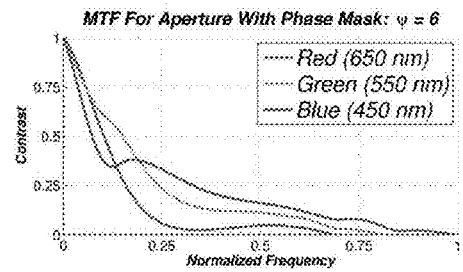

The defocus parameter $\Psi$ describes the maximum phase error at the aperture edge. For $\Psi > 1$ the image experiences contrast loss and for $\Psi > 4$ the image experiences information loss and even reversal of contrast for some spatial frequencies, as shown in FIG. 2.

For a circular aperture, the diffraction limit maximum spatial frequency (also known as the cut-off frequency) is:

$$f_c = \frac{2R}{\lambda z_i} \quad \text{(EQ. 1.8)}$$

The resolution of the optical system rises as the aperture size increases. At the same time, the DOF decreases as the defocus parameter $\Psi$ increases, per EQ. (1.6), thus reducing the resolution of OOF objects.

Optical Phase Mask

A binary optical phase mask with circular symmetry has been utilized in Ref. [1]. This mask was composed of one or several rings providing a predetermined phase-shift (e.g., $\pi$). It was found by the present inventors that such phase mask provides the exact desired phase shift for a single wavelength only, while the phase shift for other wavelength changes accordingly. In Ref. [2], an RGB phase mask was employed. This phase mask exhibits different responses in different color channels R, G and B, as shown in FIGS. 3A-D and 4A-B. Each of the channels employed by the RGB phase mask provides best performance for different field regions, so that the three channels jointly provide an extended DOF as shown in the simulation results exhibited by FIGS. 5A-R. The present inventors successfully fused RGB channels into an improved color image.

Image Representation Using Overcomplete Dictionary

Natural images share common features over small patches. By using an overcomplete dictionary those patches can be presented as a linear combination of a limited number of predefined patches from the dictionary.

Consider a signal column vector $x \in R^m$ and a dictionary $D \in R^{m \times N}$ composed of N columns atoms signals. The signal x is said to have a sparse approximation over D when there is a linear combination vector $\alpha \in R^N$ of only a few atoms in D that provide an approximation of the signal. This sparse approximation problem can be described as:

$$\min_{\alpha} \|x - D\alpha\|_2^2 + \lambda \|\alpha\|_0 \qquad \text{(EQ. 1.9)}$$

where $\lambda$ is a regularization parameter.

The sparse approximation problem is known as NP-hard but can be efficiently solved with several known techniques including, without limitation, a pursuit algorithm, e.g., Orthogonal Matching Pursuit (OMP), Matching Pursuit, Basis Pursuit, Order Recursive Matching Pursuit, Focal Underdetermined System Solver, or any combination or variation thereof (see, for example, [14]). The dictionary D can be produced from either predesigned transforms such as Wavelet, CTF and the like, or from a set of sampled data from training images [3]. It was found by the present inventors that a training image can be used for the training data, and a classification process can be employed to create a global dictionary D composed of specially selected patches which can be reshaped to vector columns $d_f \in R^{64 \times 1}$.

Non-Blind Image

A non-blind case, in which the blurring kernel is known, is considered before the blind case.

When a sharp image S is blurred by a known kernel h, a blurred image B is formed and can be described as:

$$B = S * h + \eta \qquad \text{(EQ 1.10)}$$

Where $\eta$ is additive Gaussian noise and * refers to the convolution operator. In the following, it is assumed that $\eta < 1$. Using OMP the following problem is solved $$\alpha_i = \arg\min_{\alpha} \|b_i - D_b \alpha_i\|_2^2 + \lambda \|\alpha_i\|_0 \qquad \text{(EQ. 1.11)}$$

where $\alpha_i \in R^N$ are the vector coefficients corresponding to the i-th patch $b_i \in R^m$ from the blurred image and $D_b \in R^{m \times N}$ is the blurred dictionary generated from the sharp dictionary D using the same blurred kernel h. The solution of EQ. 1.11 produces the sparse code coefficients $\alpha$ of the blurred image as a linear combination of atoms from the blurred dictionary $D_b$. The sharp image can be recovered by D and $\alpha$. This process implies that for all i, D, $\alpha$ estimates of the sharp patch $s_i$.

The relation between the two dictionaries allows restoring the original image from the blurry image. The restoration process can include a dictionary learning process.

A known method for dictionary training is KSVD [15] which is an iterative process, alternating between finding the best vector coefficients using OMP and then updating D according to the current coefficients vector using Singular Value Decomposition (SVD).

Figure 6D:
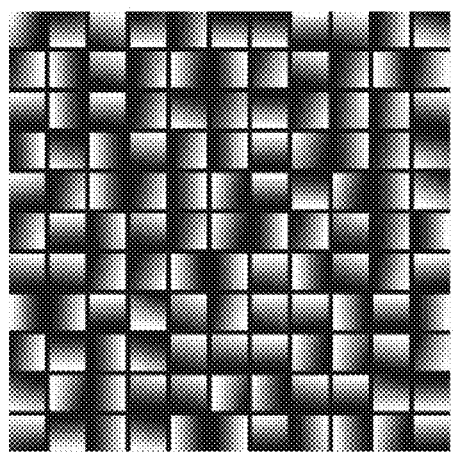
Figure 8C:
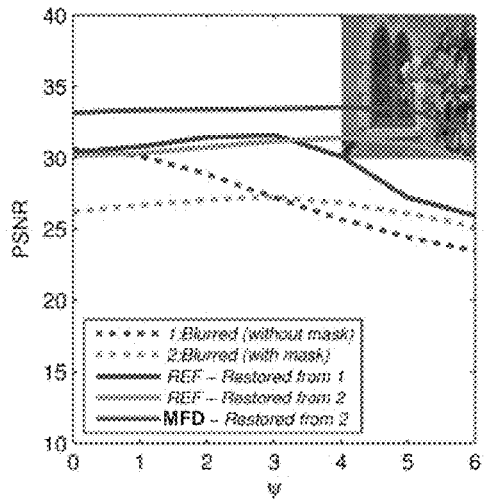
Figure 8D:
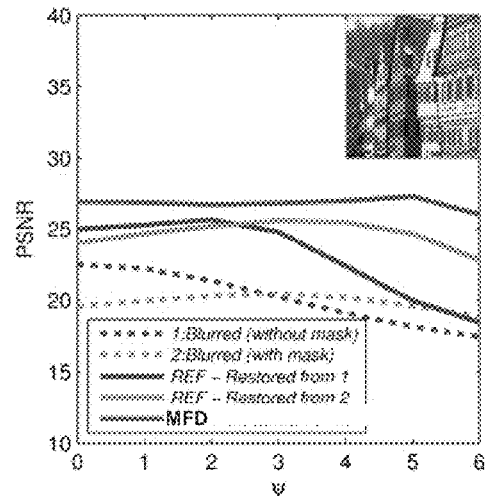
Figure 8E:
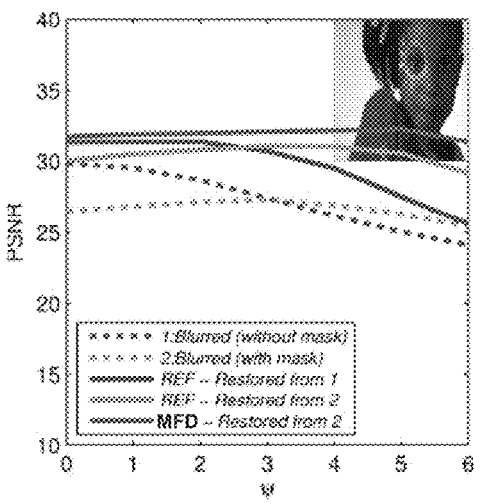
Figure 8F:
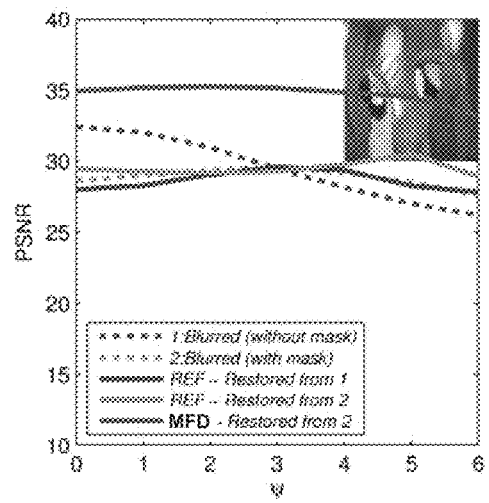
Figure 8G:
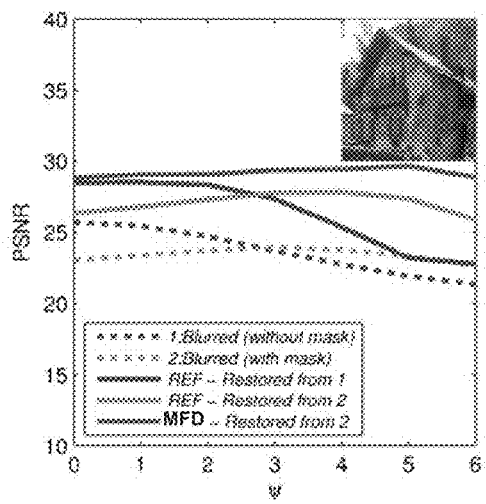
Figure 8H:
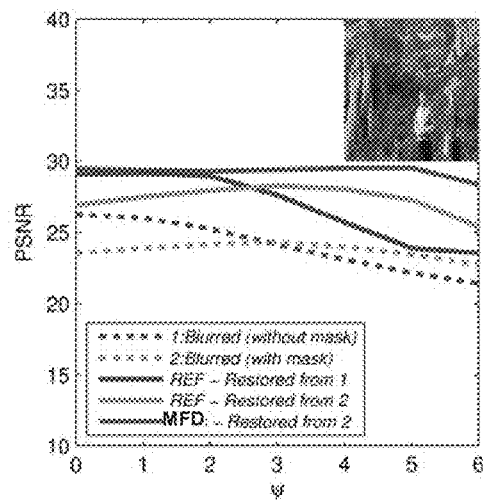

In some embodiments of the present invention this approach is modified as follows. The blur kernel in most cases transfers only the low spatial frequency in a specific patch while suppressing most of the high frequencies as shown in FIGS. 6A-D. Thus, the difference between the focused patches and the blurred patches is much higher for the random choice of patches (see FIGS. 6A and 6B) than that obtained with a selected set of patches consisting of primarily lower spatial frequency components (FIGS. 6C and 6D). By choosing only low spatial frequencies patches for the dictionary, the corresponding blurred patches resemble the sharp patches and there is a better chance of selecting the correct sparse code coefficients $\alpha$, thus making the dictionary more robust.

Blind Image

In the case of blind image deblurring the blur kernel is unknown and may vary with the object position.

It was found by the present inventors that iterative processes such as those described in [7-9] consume large computing resources. According to some embodiments of the present invention an RGB optical phase mask is employed so that the image is restored, optionally and preferably without any iterative process. In addition, the technique of the present embodiments optionally and preferably handles both flat and depth scenes in the same manner, making it more robust for general real life scenes.

A natural scene can be described as a 3D scene consisting of a finite number of flat objects. Such a scene is referred to as a 2.5D scene. Each object in the scene is considered as being located in a single plane. Without loss of generality, it is assumed that all objects in the scene are blurred with a blurring kernel that is affected only by the defocus parameter $\Psi$ of that scene. For this application one can construct a number of dictionaries created using a blurring kernel with different defocus parameter. For example, when $\Delta\psi=1$ is sufficiently discriminatory and $\Psi$ spans from 0 to 6, it is sufficient to represent 7 dictionaries (e.g., a first dictionary for $\psi=0$, a second dictionary for $\Psi=1$, etc.). These dictionaries can be joined into one matrix, referred to herein as a "Multi-Focus Dictionary" (MFD). This procedure is schematically illustrated in FIG. 7.

In the present example, 8×8×3 patches or 192×1 vectors containing the RGB information for each patch were used to process color images. The sharp in-focus dictionary D was composed of low-frequencies RGB vectors. The blurred MFD $D_b$ was composed of a set of different dictionaries generated from D using different blurring kernels.

The blurry image can thus be described using $D_b$. The OMP process chooses elements from the dictionary that best match the input patch based on largest inner product. Using the RGB phase mask, the blurred dictionary varies strongly for different kernels since the response of the imaging system is very different for each color (see FIGS. 4A-B). An input patch (or vector) from an imaging system with the RGB mask also exhibits different response for each color. The responses are therefore distinguishable among different kernels so that the likelihood that the input vector is in accordance with vectors from $D_b$ that experience the same blurring process is high. Thus, the technique of the present embodiments improves the likelihood that the correct blurry elements are selected from $D_b$.

Computer Simulation Results

The technique of the present embodiments was compared with the algorithm disclosed by Krishnan, et al. [8]. The technique of the present embodiments produced better results for natural images out of the Kodak dataset. The process was also employed on texture images (Colored Brodatz Texture database) and observed similar performance. This result demonstrates that the MFD dictionary of the present embodiments can work on any natural scene.

In all cases the images were blurred by a blurring kernel with defocus parameter $\Psi$ ranging from 0 to 6 with and without a phase mask. Blurred images with mask were additionally restored using the method of the present embodiments.

FIGS. 8A-H are plots that show the results of the comparison. Dashed blue lines correspond to images blurred with phase mask, dashed green lines correspond to images blurred without phase mask, solid blue and green lines correspond to restoration according to the teachings of Krishnan, et al., and solid red lines correspond to restoration using the MFD of the present embodiments. Each plot refers to a different image and describes the peak signal-to-noise ratio (PSNR) as a function of the defocus parameter. As shown in FIGS. 8A-H, the results obtained according to the teachings of Krishnan, et al. presented lower value of PSNR in all cases.

FIGS. 9A-F show example of image blurring and restoration, where FIG. 9A shows the input image, FIGS. 9B and 9C show images corresponding to out-of-focus ($\Psi=6$) with clear aperture (FIG. 9B) and with phase mask (FIG. 9C), FIGS. 9D and 9E are results of de-blurring, respectively applied to FIGS. 9B and 9C obtained according to the teachings of Krishnan, et al, and FIG. 9F is a result of de-blurring applied to FIG. 9C using the MFD of the present embodiments.

The technique of the present embodiments can also be applied to a 2.5D scene, because the restoration that applies to one region of an image frame is independent on the restoration process of other regions in the same frame.

To demonstrate this process consider a 2.5D scene with four objects (three persons and the background) each located in a different distance from the camera as shown in FIG. 10A. The input image corresponding to the 2.5D scene of FIG. 10A is shown in FIG. 10B. A depth map of the 2.5D scene is shown in FIG. 10C, where the depths (values shown on the color bar of FIG. 10C) are expressed in term of the defocus parameter $\Psi$.

In the present example, a pseudo-color representation is used for the identification of different depth regions contained in the scene. The procedure according to some embodiments of the present invention is based on the diversification due to acquisition of three different color channels in the presence of a chromatically dependent phase-mask (e.g., an RGB phase mask).

FIGS. 11A-C show results obtained without RGB phase mask. In this example, the focus point was set to the background region of the scene (FIG. 11A). After restoration (FIG. 11B), the out-of-focus objects in the front improved but the other object and the background are distorted and there are many visible artifacts. The depth map (FIG. 11C) shows that most atoms were taken from the first sub-dictionary ($\Psi=0$) so that therefore there was no distinction between different objects inside the scene.

FIGS. 12A-C show the results obtained with an imaging system comprising a phase mask followed by the blind restoration image processing of the present embodiments. FIG. 12A shows the blurred image taken with a phase mask. FIG. 12B shows the restoration results. As shown, all objects are restored without noticeable artifacts and with smooth transition between adjacent objects. FIG. 12C shows the depth map according to the mostly used sub-dictionary in each area. As shown, in most areas, particularly those with many details, the atoms were chosen mostly from the sub-dictionary that corresponds to the blurring kernel in that area.

Experimental Results

The technique of the present embodiments was tested on a table-top real object scene using a commercial camera equipped with an RGB phase mask. The results are shown in FIGS. 13A-D, where FIGS. 13A and 13C show results obtained without the phase mask and FIGS. 13B and 13D show results obtained with the phase mask and the image processing technique that follows, according to the present embodiments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] B. Milgrom, N. Konforti, M. A. Golub, and E. Marom, "Pupil coding masks for imaging polychromatic scenes with high resolution and extended depth of field," Opt Express, vol. 18, pp. 15569-84, Jul. 19, 2010.

[2] B. Milgrom, N. Konforti, M. A. Golub, and E. Marom, "Novel approach for extending the depth of field of Barcode decoders by using RGB channels of information," Opt Express, vol. 18, pp. 17027-39, Aug. 2, 2010.

[3] M. Elad, Sparse and redundant representations: from theory to applications in signal and image processing. New York: Springer, 2010.

[4] F. Couzinie-Devy, J. Mairal, F. Bach, and J. Ponce, "Dictionary learning for deblurring and digital zoom," arXiv preprint arXiv:1110.0957, 2011.

[5] H. Huanga and N. Xiaoa, "Image Deblurring Based on Sparse Model with Dictionary Learning," 2013.

[6] Q. Shan, J. Jia, and A. Agarwala, "High-quality motion deblurring from a single image," in ACM Transactions on Graphics (TOG), 2008, p. 73.

[7] Z. Hu, J. B. Huang, and M. H. Yang, "Single image deblurring with adaptive dictionary learning," in Image Processing (ICIP), 2010 17th IEEE International Conference on, 2010, pp. 1169-1172.

[8] D. Krishnan, T. Tay, and R. Fergus, "Blind deconvolution using a normalized sparsity measure," in Computer Vision and Pattern Recognition (CVPR), 2011 IEEE Conference on, 2011, pp. 233-240.

[9] H. Zhang, J. Yang, Y. Zhang, and T. S. Huang, "Sparse representation based blind image deblurring," in Multimedia and Expo (ICME), 2011 IEEE International Conference on, 2011, pp. 1-6.

[10] R. Ng, M. Levoy, M. Brédif, G. Duval, M. Horowitz, and P. Hanrahan, "Light field photography with a handheld plenoptic camera," Computer Science Technical Report CSTR, vol. 2, 2005.

[11] A. Levin, R. Fergus, F. Durand, and W. T. Freeman, "Image and depth from a conventional camera with a coded aperture," ACM Transactions on Graphics (TOG), vol. 26, p. 70, 2007.

[12] F. Guichard, H.-P. Nguyen, R. Tessières, M. Pyanet, I. Tarchouna, and F. Cao, "Extended depth-of-field using sharpness transport across color channels," in IS &T/SPIE Electronic Imaging, 2009, pp. 72500N-72500N-12.

[13] J. W. Goodman, Introduction to Fourier optics, 2nd ed. New York: McGraw-Hill, 1996.

[14] S. S. Chen, D. L. Donoho, and M. A. Saunders, "Atomic decomposition by basis pursuit," SIAM journal on scientific computing, vol. 20, pp. 33-61, 1998.

[15] M. Aharon, M. Elad, and A. Bruckstein, "K-SVD: An algorithm for designing overcomplete dictionaries for sparse representation," Ieee Transactions on Signal Processing, vol. 54, pp. 4311-4322, November 2006.

What is claimed is:

1. A method of processing an image, comprising:
decomposing the image into a plurality of channels, each being characterized by a different depth-of-field, and storing said decomposed image in a memory;
accessing, by a digital image processor, a non-transitory computer readable medium storing an in-focus dictionary defined over a plurality of dictionary atoms, and an out-of-focus dictionary defined over a plurality of sets of dictionary atoms, each set corresponding to a different out-of-focus condition;
computing, by said image processor, at least one sparse representation of said decomposed image over said dictionaries, and storing said at least one sparse representation in a memory, wherein said image is divided into a plurality of patches, and wherein said computing is performed by expressing each patch as a combination of atoms of a sub-dictionary of said out-of-focus dictionary; and
generating by said image processor a processed image using said sparse representation, and displaying said processed image on a display device.

2. The method of claim 1, wherein said decomposing is done optically at the time of image capture.

3. The method of claim 1, wherein said decomposing is done by digital image processing.

4. The method according to claim 1, wherein said sparse representation is computed such that different region of said image have different defocus conditions.

5. A method of imaging, comprising:
capturing an image of a scene using an imaging device having an optical mask selected to optically decompose said image into a plurality of channels, each being characterized by a different depth-dependence of a spatial frequency response of said imaging device;
by a digital image processor, accessing a non-transitory computer readable medium storing an in-focus dictionary defined over a plurality of dictionary atoms, and an out-of-focus dictionary defined over a plurality of sets of dictionary atoms, each set corresponding to a different out-of-focus condition;
computing, by said image processor, at least one sparse representation of said decomposed image over said dictionaries, and storing said at least one sparse representation in a memory, wherein said image is divided into a plurality of patches, and wherein said computing is performed by expressing each patch as a combination of atoms of a sub-dictionary of said out-of-focus dictionary and
generating by said image processor a processed image using said sparse representation, and displaying said processed image on a display device.

6. The method according to claim 1, further comprising constructing a depth map of the scene, based on said sparse representation.

7. The method according to claim 6, further comprising re-focusing at least a portion of said image based on said depth map.

8. The method according to claim 6, further comprising generating a three-dimensional image based on said depth map.

9. The method according to claim 6, wherein said depth map is constructed based on a single image frame.

10. An imaging system, comprise:
an imaging device having an optical mask and being configured for capturing an image of a scene, wherein said optical mask is selected to optically decompose said image into a plurality of channels, each being characterized by a different depth-dependence of a spatial frequency response of said imaging device;
a non-transitory computer readable medium storing an in-focus dictionary defined over a plurality of dictionary atoms, and an out-of-focus dictionary defined over a plurality of sets of dictionary atoms, each set corresponding to a different out-of-focus condition; and
a digital image processor configured for accessing said computer readable medium, for computing and storing in a memory at least one sparse representation of said decomposed image over said dictionaries, for generating a processed image using said sparse representation, and for displaying said processed image on a display device, wherein said image is divided into a plurality of patches, and wherein said computing is performed by expressing each patch as a combination of atoms of a sub-dictionary of said out-of-focus dictionary.

11. A portable device, comprising the imaging system of claim 10.

12. The portable device of claim 11, being selected from the group consisting of a cellular phone, a smartphone, a tablet device, a mobile digital camera, a wearable camera, a personal computer, a laptop, a portable media player, a portable gaming device, a portable digital assistant device, and a portable navigation device.

13. The imaging system according to claim 10, wherein said data processor is configured for constructing a depth map of the scene, based on said sparse representation.

14. The imaging system according to claim 13, wherein said data processor is configured for re-focusing at least a portion of said image based on said depth map.

15. The imaging system according to claim 13, wherein said data processor is configured for generating a three-dimensional image based on said depth map.

16. The imaging system according to claim 13, wherein said depth map is constructed based on a single image frame.

17. A computer software product, comprising a non-transitory computer-readable medium in which an in-focus dictionary, an out-of-focus dictionary and program instructions are stored,
wherein said in-focus dictionary is defined over a plurality of dictionary atoms, and said out-of-focus dictionary is defined over a plurality of sets of dictionary atoms, each set corresponding to a different out-of-focus condition, and wherein said instructions, when read by digital image processor, cause the image processor to receive an image, to decompose the image into a plurality of channels and to store said decomposed image in a memory, to access said in-focus dictionary and said out-of-focus dictionary, to compute and store in a memory at least one sparse representation of said decomposed image over said dictionaries to generate a processed image using said sparse representation, and to display said processed image on a display device, wherein said image is divided into a plurality of patches, and wherein said computing is performed by expressing each patch as a combination of atoms of a sub-dictionary of said out-of-focus dictionary.

18. The computer software product of claim 17, wherein said sparse representation is computed such that different region of said image have different defocus conditions.

19. The method according to claim 1, wherein said plurality of channels is a plurality of color channels.

20. The method according to claim 1, wherein said computing said sparse representation is executed without iteration.

21. The method according to claim 1, wherein each patch of at least a few of said patches overlaps with at least one adjacent patch.

22. The method according to claim 1, wherein said few patches comprise 50% of said patches.

23. The method according to claim 1, wherein for each of at least a few pairs of adjacent patches, said overlap equals at least 50% of an area of each patch of said pair.

24. The method according to claim 1, wherein said out-of-focus dictionary comprises a plurality of sub-dictionaries, each being characterized by a defocus parameter, and wherein different sub-dictionaries correspond to different values of said defocus parameter.

25. The method according to claim 24, wherein each of said plurality of sub-dictionaries is obtainable from said in-focus dictionary by an inner product of said in-focus dictionary by a kernel function characterized by a respective defocus parameter.

26. The method according to claim 24, wherein said out-of-focus dictionary comprises at least three sub-dictionaries.

27. The method according to claim 24, wherein said out-of-focus dictionary comprises at least four sub-dictionaries.

28. The method according to claim 24, wherein said out-of-focus dictionary comprises at least five sub-dictionaries.

29. The method according to claim 24, wherein said out-of-focus dictionary comprises at least six sub-dictionaries.

30. The method according to claim 24, wherein said out-of-focus dictionary comprises at least seven sub-dictionaries.

31. The method according to claim 1, wherein at least P % of atoms of said in-focus dictionary are characterized by a spatial frequency which is at most a predetermined cutoff frequency, said predetermined cutoff frequency corresponding to at most T transitions between dark and bright picture-elements along any straight line across a respective atom, wherein P is at least 50, wherein T equals $\lfloor 0.5 \, L \rfloor$, and wherein L is a width of said atom.

32. A method of processing an image, comprising:
decomposing the image into a plurality of channels, each being characterized by a different depth-of-field, and storing said decomposed image in a memory;
accessing, by a digital image processor, a non-transitory computer readable medium storing an in-focus dictionary defined over a plurality of dictionary atoms, and an out-of-focus dictionary defined over a plurality of sets of dictionary atoms, each set corresponding to a different out-of-focus condition, wherein said out-of-focus dictionary comprises a plurality of sub-dictionaries, each being characterized by a defocus parameter, and wherein different sub-dictionaries correspond to different values of said defocus parameter;
computing, by said image processor, at least one sparse representation of said decomposed image over said dictionaries and storing said at least one sparse representation in a memory; and
generating by said image processor a processed image using said sparse representation, and displaying said processed image on a display device.

33. The method of claim 32, wherein said decomposing is done optically at the time of image capture.

34. The method of claim 32, wherein said decomposing is done by digital image processing.

35. The method according to claim 32, wherein said sparse representation is computed such that different region of said image have different defocus conditions.

36. The method according to claim 32, further comprising constructing a depth map of the scene, based on said sparse representation.

37. The method according to claim 36, further comprising re-focusing at least a portion of said image based on said depth map.

38. The method according to claim 36, further comprising generating a three-dimensional image based on said depth map.

39. The method according to claim 36, wherein said depth map is constructed based on a single image frame.

40. An imaging system, comprise:
an imaging device having an optical mask and being configured for capturing an image of a scene, wherein said optical mask is selected to optically decompose said image into a plurality of channels, each being characterized by a different depth-dependence of a spatial frequency response of said imaging device;
a non-transitory computer readable medium storing an in-focus dictionary defined over a plurality of dictionary atoms, and an out-of-focus dictionary defined over a plurality of sets of dictionary atoms, each set corresponding to a different out-of-focus condition, wherein said out-of-focus dictionary comprises a plurality of sub-dictionaries, each being characterized by a defocus parameter, and wherein different sub-dictionaries correspond to different values of said defocus parameter; and
a digital image processor configured for accessing said computer readable medium, for computing and storing in a memory at least one sparse representation of said decomposed image over said dictionaries, for generating a processed image using said sparse representation, and for displaying said processed image on a display device.

41. A portable device, comprising the imaging system of claim 10.

42. The portable device of claim 41, being selected from the group consisting of a cellular phone, a smartphone, a tablet device, a mobile digital camera, a wearable camera, a personal computer, a laptop, a portable media player, a portable gaming device, a portable digital assistant device, and a portable navigation device.

43. The imaging system according to claim 40, wherein said data processor is configured for constructing a depth map of the scene, based on said sparse representation.

44. The imaging system according to claim 43, wherein said data processor is configured for re-focusing at least a portion of said image based on said depth map.

45. The imaging system according to claim 43, wherein said data processor is configured for generating a three-dimensional image based on said depth map.

46. The imaging system according to claim 43, wherein said depth map is constructed based on a single image frame.

47. The imaging system according to claim 40, wherein each of said plurality of sub-dictionaries is obtainable from said in-focus dictionary by an inner product of said in-focus dictionary by a kernel function characterized by a respective defocus parameter.

48. The imaging system according to claim 40, wherein a number of sub-dictionaries in said out-of-focus dictionary is selected from the group consisting of at least three sub-dictionaries, at least four sub-dictionaries, at least five sub-dictionaries, at least six sub-dictionaries and at least seven sub-dictionaries.

49. A method of processing an image, comprising:
decomposing the image into a plurality of channels, each being characterized by a different depth-of-field, and storing said decomposed image in a memory;
accessing, by a digital image processor, a non-transitory computer readable medium storing an in-focus dictionary defined over a plurality of dictionary atoms, and an out-of-focus dictionary defined over a plurality of sets of dictionary atoms, each set corresponding to a different out-of-focus condition, wherein at least P % of atoms of said in-focus dictionary are characterized by a spatial frequency which is at most a predetermined cutoff frequency, said predetermined cutoff frequency corresponding to at most T transitions between dark and bright picture-elements along any straight line across a respective atom, wherein P is at least 50, wherein T equals $\lfloor 0.5\,L \rfloor$, and wherein L is a width of said atom;
computing, by said image processor, at least one sparse representation of said decomposed image over said dictionaries and storing said at least one sparse representation in a memory; and
generating by said image processor a processed image using said sparse representation, and displaying said processed image on a display device.

* * * * *